United States Patent Office 3,723,310
Patented Mar. 27, 1973

3,723,310
PROCESS FOR FLOCCULATING OIL AND CLAY-CONTAINING SLIMES
William J. Lang, Libertyville, and Donald A. Hentz, Barrington, Ill., assignors to International Minerals & Chemical Corporation
No Drawing. Filed Oct. 7, 1969, Ser. No. 864,518
Int. Cl. B01d 21/01; C02b 1/20
U.S. Cl. 210—53                    2 Claims

ABSTRACT OF THE DISCLOSURE

Finely-divided clay having hydrocarbons in intimate association therewith is flocculated and settled from an aqueous suspension thereof by adding acrylic acid or a water-dispersible anionic acrylic acid-derived polymer, and allowing resulting flocculated solids to settle. Suspended silica may also be flocculated and settled by adding a water-dispersible cationic or nonionic polymer or an inorganic salt as a secondary flocculant.

BACKGROUND OF THE INVENTION

This invention relates to a process for separating solids suspended in an aqueous media and, more particularly, to a process for flocculating and settling finely-divided clay and silica from a colloidal suspension thereof which also includes hydrocarbons in intimate association with the clay.

Certain ore processing operations result in the production of aqueous suspensions of finely-divided particles, commonly known as "slimes." In many instances the solids must be separated from the water for further processing, or to produce a clarified stream such as for recycle into the process. For example, many ore processing plants include a water-wash operation on a closed system basis so that water which was used to wash impurities from the ore is recycled for use. It is, therefore, of primary importance that the solids content of water utilized to wash impurities from an ore be substantially reduced before the water is recycled for further use in order to minimize the quantity of water needed. The disposal of the suspension of solids also often presents a pollution problem. It is highly desirable, or sometimes even required by law, to avoid pollution of lakes and streams by reducing the quantity of suspended finely-divided material in water to a specified maximum level before the water is discharged.

Settling, filtration, or combinations of these processes often are unsatisfactory methods of treating such slime fractions because of the fineness of the suspended solids. These particles resist settling under gravity or in centrifuges, and plug the pores of the filter media when attempts are made to separate the solids by filtration. Considerable effort has been spent to develop economic and efficient processes for removing the finely-divided particles from the aqueous suspensions thereof. Various natural and synthetic flocculants have been suggested for use in such settling and filtration processes. For example, U.S. Pat. No. 3,397,953 of Galvin et al. is directed to a process utilizing a flocculating agent containing starch and polyacrylic acid for the flocculation and sedimentation of an iron oxide suspenion. Dajani et al. disclose in U.S. Pat. No. 3,408,293 a process utilizing the sequential addition of an anionic polymer followed by a cationic polymer for removing coal fines and clay from an aqueous suspension. U.S. Pat. No. 3,087,890 of Pye describes a process for concentrating and separating finely-divided mineral solids from an aqueous suspension thereof by dispersing throughout the suspension, with a minimum of violent or turbulent agitation, an acrylamide polymer and up to 15% by weight of the polymer of a monomer such as acrylic acid, and then passing the treated suspension into a quiescent zone to bring about the development of agglomerates of the finely-divided material.

It will readily be noted from the prior art that a process for flocculating and settling finely-divided solids from one type of an aqueous suspension is of little or no value in clarifying another type of an aqueous suspension. One type of suspension from which it has been especially difficult to remove solids is an aqueous suspension of finely-divided silica and clay having hydrocarbons in intimate association therewith. Aqueous suspensions such as these result from the processing of tar sands by the so-called "hot water process."

SUMMARY OF THE INVENTION

This invention is based upon the discovery that finely divided clay having hydrocarbons in intimate association therewith which is suspended in an aqueous medium having a pH of at least 6.0, preferably from 6.0 to 10.0, can be flocculated and settled by the addition of acrylic acid or a water-soluble acrylic acid-derived polymer in an amount sufficient to form a floc of the clay.

This invention is based on the further discovery of a process for also flocculating and settling finely-divided silica when the aqueous suspension contains suspended silica in addition to the clay having hydrocarbons in intimate association therewith. In accordance with this procedure, a water-soluble primary flocculant of the group consisting of acrylic acid and an anionic acrylic acid-derived polymer is added to the suspension in an amount sufficient to form a floc of the clay and associated hydrocarbons. A water-soluble secondary flocculant of the group consisting of a nonionic polymer, a cationic polymer and an inorganic salt is also added to the suspension in an amount sufficient to form a floc of the silica content of the suspension. When a nonionic polymer is used as a secondary flocculant, the primary flocculant may be added prior to or at the time the nonionic polymer is added, but no later than the time the nonionic polymer is added. However, the primary flocculant is always added prior to the time a cationic polymer or inorganic salt is added when the latter materials are used as secondary flocculants.

In the preferred method of this invention, a nonionic polymer is utilized as the secondary flocculant. The employment of a cationic polymer or an inorganic salt as the secondary flocculant possesses the disadvantage that it is best to separate the floc produced by the addition of the primary flocculant prior to the addition of the secondary flocculant. However, this is not the case when a nonionic polymer is used as the secondary polymer. Therefore, the use of a nonionic polymer as the secondary flocculant possesses the advantage of allowing the concomitant addition of the two flocculants, if desired.

For the purpose of this application, the term "intimate association" used to define the relationship between the clay and oil means the components may not readily be separated by mechanical size segregation, filtration or selective absorption.

DESCRIPTION OF THE PREFERRED EMBODIMENTS

As mentioned above the process of this invention is especially useful for flocculating and settling solids from aqueous suspensions such as those produced by utilizing the "hot water process" for recovering oil from tar sands. Tar sands, which are also sometimes referred to as oil sands and bituminous sands, are found in various areas throughout the world. One of the most extensive deposits of tar sands occurs in the Athabasca district of the province of Alberta, Canada.

The star sands of Athabasca district typically contain from about 6% to about 20% by weight of oil, from about 1% to about 10% by weight of water, and from about 70% to about 90% by weight of inorganic solids. The oil is very viscous and has a specific gravity varying from about 1.0 to about 1.05. Fine grain coarse sand having a particle size greater than about 45 microns and less than about 200 microns constitutes the major portion of the inorganic solids. The remaining inorganic solid material, which is from about 10 to about 30% by weight of the solid inorganic content of the tar sands, has a particle size of less than 45 microns and is referred to as fines. The fines contain clay, such as chlorite, kaolinite, illite and montmorillonite, and silt including some very small particles of sand. The composition of tar sands may, of course, vary from the aforementioned ranges.

One of the best known methods for recovering the oil from tar sands such as found in the Athabasca district is known as the "hot water process." This process comprises adding caustic soda and hot water to the tar sands to form a slurry which is introduced into a separation cell where an elevated temperature, e.g., about 150° to about 190° F., is maintained. The aerated oil rises as a froth which is drawn off, and the bulk of the coarse solids content of the tar sands settles as tailings at the bottom of the cell. A middlings stream consisting essentially of the aforementioned fines with some oil is also drawn from the cell. This middlings stream is generally subjected to a secondary extraction operation, such as in scavenger cells, to recover its oil content. In these cells the middlings solids, consisting mainly of the fine grain quartz sand having a particle size greater than about 45 microns, settle as tailings and are thus separated from the oil. The oil comes off as a froth which can be added to the primary froth collected from the main separation cell. The tailings streams from the primary and secondary extraction operations are combined and constitute slimes which can be flocculated in accordance with this invention.

The tar sands of the Athabasca district and the hot water process which is currently used for recovering the oil content therefrom are described in further detail in the Sept. 25, 1967 issue of Oil Week, published by Maclean-Hunter Publishing Company Ltd. of Calgary, Alberta, Canada.

The slimes which are produced as tailings from the hot water process are complex oil-containing slimes having a suspended solid content which will not settle within any practical time and cannot be flocculated by utilizing any of the conventional flocculation methods. It was heretofore necessary to store these slimes since they could not be disposed of without creating a nuisance and pollution problems. As illustrative of the magnitude of the problem, the Great Canadian Oil Sands Limited is reported to produce, by its use of the hot water process for extracting oil from tar sands obtained from the Athabasca district, about 80,000 tons per day of a sand tailings slurry. The slurry typically contains in suspension about 0.5 to about 1.7% clay, about 0.1 to about 0.3% sand, and about 0.2 to about 0.6% oil after the coarse silt and sand fractions have settled out of the water. It is necessary to store these large volumes of slimes in tailings storage ponds because the Canadian Government prohibits the disposal of this material into nearby rivers.

In accordance with this invention, finely-divided clay having hydrocarbons in intimate association therewith are flocculated and settled from an aqueous suspension thereof. The flocculation procedure of this invention is especially useful for flocculating and settling finely-divided solids from the complex oil-containing slimes produced by the above-described hot water process. It will be obvious to one skilled in the art that the process of this invention will be equally applicable for clarifying other similar suspensions of finely-divided silica and clay having hydrocarbons in intimate association with the clay. Such suspensions will generally contain, on a weight basis, from about 0.5 to about 25% clay, from about 0 to about 10% silica, from about 1 to about 15% hydrocarbons, and from about 55% to about 98.5% water.

It has been found that the clay and sand may be removed from the aqueous suspensions by utilizing acrylic acid or a water-soluble anionic acrylic acid-derived polymer, as hereinafter described, in combination with a conventional coagulating agent as a secondary flocculant, i.e., a cationic or nonionic polymer or an inorganic salt, and preferably a nonionic polymer. The addition of the acrylic acid or anionic acrylic acid-derived polymer to the suspension initiates selective flocculation of some of the slime components, e.g., the clay and hydrocarbons in intimate association therewith, but will not produce a clarified supernatant liquid. The use of a nonionic polyelectrolyte coagulant as the secondary flocculant and gentle agitation will cause all of the suspended material to coagulate into tough rubbery flocs which settle rapidly. The agglomerated material can then be easily separated from the bulk of the supernatant liquid by any conventional method such as decantation, filtration, centrifugation, and the like. The remaining liquid is clear and can thus be disposed of in nearby rivers and streams or recycled for processing water.

A nonionic polymer may also be used as the secondary flocculant in other, but lesser preferred, embodiments of this invention. For example, the acrylic acid or anionic polymer and the nonionic polymer may be simultaneously added to the suspension, but there generally will be less satisfactory coagulation than when the two flocculants are sequentially added. The sequence of adding the nonionic polymer prior to the addition of the acrylic acid or anionic polymer will not flocculate and settle the suspended solids.

The acrylic acid or anionic polymer may also be used in a still different manner with any of the aforementioned secondary flocculants, namely, nonionic polymer, cationic polymer or inorganic salt. This alternative procedure comprises adding the acrylic acid or anionic acrylic acid-derived polymer to the suspension in an amount sufficient to achieve the first stage floc consisting essentially of the suspended clay and associated hydrocarbons. This first stage floc forms in a layer of water which settles under the remaining suspension consisting essentially of silica as the suspended solids. The aqueous layer containing this first stage floc is then separated by any suitable manner, such as decantation, from the remaining suspension. After the two layers are separated, a nonionic or cationic polymer or an inorganic salt is then added to the suspension to achieve flocculation and settling of its suspended solid content.

The amount of flocculants utilized in accordance with this invention is that necessary to produce the desired degree of flocculation. This will, of course, depend on variables such as the solid content of the suspension, the chemical composition of the flocculants, the molecular weight of polymers utilized as flocculants, and the like. The amount of acrylic acid or anionic acrylic acid-derived polymer which is sufficient to produce a satisfactory flocculation will generally vary between about 0.05 and 0.0125 pound per 1000 gallons of suspension per percent of suspended solids, or between about 1 and about 2.5 pounds of primary flocculant per ton of suspended solids. The quantity of the secondary flocculating agent which is sufficient to form a satisfactory floc will generally vary between about 0.005 and about 0.015 pound per 1000 gallons of suspension per percent of suspended solids (or between about 1 and about 3 pounds per ton of suspended solids) for the cationic or nonionic polyelectrolyte, and 0.015 and about 0.25 pound per 1000 gallons of suspension per percent of suspended solids (or between about 3 and about 50 pounds per ton of suspended solids) for the inorganic salt. The term "suspended solids" when used above in connection with the quantities of flocculants used in the process of this invention means the solids which are originally suspended in the slimes, i.e., the solids suspended prior to the addition of either the primary or secondary flocculants. Quantities smaller and greater than the amounts given above may be used, depending on the specific flocculants utilized and the relative difficulty of flocculating the slimes.

The flocculants are preferably added to the suspension in the form of dilute aqueous solutions which are admixed with the suspension in any suitable manner. In general, the polymers will be added to water to prepare solutions containing not more than about 2.0 percent by weight of the polymers. The solutions will usually contain at least about 0.025 percent by weight of the polymers. The resulting solutions are homogeneous and free-flowing and are readily handled in conventional equipment.

A more detailed description of the flocculants which are useful in accordance with this invention is hereinafter given.

Primary flocculants

Anionic acrylic acid-derived polymers which are useful, in addition to acrylic acid, as the primary flocculant in the process of this invention include polyacrylic acid and water-soluble, e.g. alkali metal and ammonium, salts of polyacrylic acid. The alkali metal and ammonium salts may be prepared by either reaction of an appropriate basic alkali metal or ammonium compound with polyacrylic acid or polymerization of the appropriate alkali metal or ammonium salts of acrylic acid. Other suitable polymers include acrylic acid, or an alkali metal or ammonium salt thereof, copolymerized with a copolymerizing monomer such as ethylene, propylene, isobutylene, styrene, vinyl formate, vinyl acetate, acrylonitrile, methacrylonitrile, vinyl chloride, vinylidene chloride, an alkyl acrylate, an alkyl methacrylate, and alkyl maleate or another olefinic monomer. Copolymers of this type having at least 50 mol percent of the acrylic acid or derivative thereof are preferred. Polymers of this type may be prepared directly by the polymerization of suitable monomers, or by the chemical reaction of other polymers, as for example, by the hydrolysis of acrylonitrile polymers.

Useful polymers of the above types will generally have a molecular weight in the range of at least about 10,000 and up to about 1,000,000. However, acrylic acid-derived polymers having higher molecular weights may also be used so long as the polymers are water soluble. Polymers having molecular weights lower than about 10,000 are also useful, as evidenced by the fact that acrylic acid may be used as the primary flocculant.

The preferred acrylic acid-derived polymers are graft copolymers prepared by graft copolymerizing acrylic acid onto a minor amount of a substrate which is a water-soluble polyhydroxyl-containing polymeric material. The substrates which are co-reacted with the acrylic acid to produce graft copolymers which are useful in accordance with this invention are water-soluble polyhydroxyl-containing polymeric compounds. In general, these polymeric compounds may be characterized as having a molecular weight greater than about 350 and containing at least about 5% free hydroxyl groups. The polymeric compounds may contain up to 30% and even higher free hydroxyl groups. It will be evident that the polyhydroxy polymeric compounds may contain substituents other than hydroxyl groups so long as the substituents are inert, i.e., non-reactive with the acrylic acid, under the reaction conditions. Examples of substituents other than mere hydroxyl groups which the polymeric compounds may contain are halo, alkyl, aryl, carboxyalkyl, hydroxyalkyl, halohydroxyalkyl, arylhydroxyalkyl, and the like.

The useful polymeric substrates include water-soluble polysaccharides and polyhydroxyl-containing derivatives thereof. Although disaccharides and trisaccharides may be used in accordance with this invention, the preferred polymeric compounds are the tetra-, penta- and higher polysaccharides and oligosaccharides, i.e., saccharides containing at least four linked monosaccharide molecules, and derivatives thereof containing substituents such as hereinbefore defined. The most preferred substrates include derivatives of cellulose and the biochemically-synthesized heteropolysaccharides.

Some of the specific polymeric polyhydroxy compounds that may be used as substrates include, but are not limited to water-soluble derivatives of cellulose such as methyl cellulose, chlorohydroxypropyl cellulose, phenylhydroxyethyl cellulose, hydroxybutyl cellulose, hydroxyethyl cellulose, ethyl cellulose, hydroxyethyl methyl cellulose, hydroxypropyl methyl cellulose, carboxymethyl cellulose and the like cellulose ethers. Other polymeric compounds which may be co-reacted with acrylic acid in accordance with this invention include starch and water-soluble derivatives of starch, e.g., chlorohydroxypropyl starch, phenylhydroxethyl starch, hydroxybutyl starch, methyl starch, ethyl starch, hydroxyethyl starch, hydroxyethyl methyl starch, hydroxypropyl methyl starch, and carboxymethyl starch. Still other polymeric materials which may be used include the so-called "sugars" such as sucrose, maltose, lactose, raffinose, stachyose and vertascose; causticized lignite; biochemically synthesized heteropolysaccharides, e.g., produced by the action of bacteria of the genus Xanthomonas or the genus Arthrobacter on carbohydrates; polyvinyl alcohol; and polyalkylene glycols and derivatives thereof such as alkoxy polyalkylene glycols, e.g., polyethylene glycols and methoxy polyethylene glycols. Useful compounds include those compounds which will form the above-defined polymeric compounds in the acidic reaction medium and such compounds are included in the scope of this invention. For example, carboxymethyl cellulose will be formed from the sodium salt thereof in the acidic reaction medium.

The amount of the substrate which is reacted with acrylic acid may vary between about 0.1 and about 10.0%, preferably between about 0.25 and about 5.0%, based on the total weight of the acrylic acid used.

The graft copolymerization can be carried out, as for example, in an aqueous medium by using well-known polymerization techniques. Ultraviolet light or any of the well-known peroxygentype initiators, e.g., peroxide free radical initiators, may be used. The preferred peroxygen-type initiators are hydrogen peroxide and hydroperoxides such as t-butyl hydroperoxide, diisopropylbenzene hydroperoxide, cumene hydroperoxide, 1-phenylethyl hydroperoxide, and the like. Other useful peroxide initiators are diacyl peroxides such as benzoyl peroxide and acetyl peroxide, and dialkyl peroxides such as di-t-butyl peroxide and dicumyl peroxide. Still other useful peroxygen-type initiators include per-salts such as sodium, potassium or ammonium persulfate and sodium perborate; the peresters such as t-butyl peroxyacetate and t-butyl peroxybenzoate; and the peracids such as performic acid, peracetic acid, perbenzoic acid, and peroxylactic acid. If desired, Redox activated systems can be used in accordance with the usual polymerization practices. Thus, sodium bisulfite-potassium persulfate and hydrogen peroxide-ferrous ion systems may be employed. However, the incremental addition of the peroxygen-type initiator is preferred when a Redox activated system is utilized.

The quantity of the initiator employed can be varied depending on the reaction temperature and other conditions, but will ordinarily be from about 0.0005 to about 0.01%, preferably from about 0.002 to about 0.004%, based on the weight of the acrylic acid.

The temperature of the reaction is not critical and may vary between about −5° C. and about 100° C. The preferred temperature range is between about 40° C. and about 80° C., with a temperature between about 60° C. and about 70° C. being most preferred. The reaction may be carried out under superatmospheric pressure or even under partial vacuum. However, it is preferred to utilize atmospheric pressure for convenience since the reaction runs very favorably at this pressure. If desired, the reaction may be carried out under an inert atmosphere such as nitrogen or helium.

The graft copolymerization reaction is carried out in an acidic aqueous medium. The pH of the reaction medium may be any value up to and including about 3.5. It is preferred to maintain the pH between about 3.0 and about 3.5 for optimum results. In the event the amount of acrylic acid utilized is not sufficient to lower the pH of the reaction medium to a value of 3.5 or lower, the desired pH may be obtained by the addition of a suitable mineral acid such as sulfuric acid, nitric acid or hydrochloric acid.

The reactants and the initiator are combined in the aqueous reaction medium in any conventional manner. However, the initiator should not be added to the reaction medium containing only the acrylic acid since this could cause the polymerization of the acrylic acid in the absence of the polyhydroxy polymeric substrate. As illustrative of a suitable manner of combining the reactants, the acrylic acid and the polymeric compound are each dissolved in separate amounts of water so as to provide homogeneous solutions thereof. These solutions are mixed and the initiator is then added to the mixed solution. Alternatively, the polymeric substrate material may be dissolved in water to provide a homogeneous solution to which the acrylic acid and the initiator are added. Other methods of combining the reactants and initiator will be obvious to one skilled in the art. Optimum results will be obtained if the polymeric substrate is thoroughly dissolved in at least a part of the aqueous reaction medium before it is combined with the acrylic acid. Stirring or shaking of the reaction mixture will facilitate the polymerization and result in more uniform polymers.

The reaction time will vary according to the reaction temperature and/or quantity of the initiator present. In general, the time should be sufficient to consume at least 95% of the acrylic acid. Polymerization may be detected by the absence of the distinctive odor of acrylic acid.

At the completion of the polymerization reaction, the copolymer thus produced may be converted to the salt form. This conversion is generally effected by neutralization with an appropriate hydroxide. Alkali metal or ammonium salts of the copolymers such as sodium, potassium and lithium salts may be obtained by reacting the copolymers with the corresponding hydroxide. Where complete neutralization is desired, a stoichiometric amount, and preferably a slight excess, of the hydroxide is used. Partial salts may, of course, be produced by using less than the quantity of alkali metal or ammonium hydroxide to effect complete conversion of the carboxyl groups.

Secondary flocculants

As discussed above a wide variety of materials may be suitably employed as the secondary flocculants in the two stage process of this invention.

The preferred materials are nonionic polymers. Polyvinyl pyrrolidone, polyacrylamide, poly N,N-dialkylacrylamide, hydroxyethyl cellulose, methyl cellulose, ethyl cellulose and polyvinyl alcohol are examples of nonionic polymers which may be used as secondary flocculants. One of the most preferred nonionic polyelectrolytes is sold by the Dow Chemical Company under the trademark of Separan NP-10. This material which is represented by the formula:

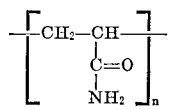

is reported to have a molecular weight of approximately one million and is formed by the polymerization of acrylamide. Another of the most preferred nonionic polymers is a polymerized ethylene oxide with a molecular weight in the order of 4,000,000 to greater than 5,000,000 sold under the trademark of Polyox.

Other polymers which are useful as secondary flocculants are cationic polymers. These materials include polyvinyl pyridine, polyamines such as formed by the reaction of alkylene polyamines and difunctional alkyl materials such as ethylene dichloride, polyamines prepared by the reaction of an alkylene dihalide and amines such as ethylene diamine, amine-aldehyde resins and polyimines.

Polymers useful as secondary flocculants will generally have molecular weights of at least 1,000,000, and preferably of at least 4,000,000.

Useful inorganic salts include water-soluble inorganic salts having such cations as $H^+$, $Ag^+$, $Hg_2^{++}$, $Pb^{++}$, $Hg^{++}$, $Ca^{++}$, $Bi^{+++}$, $As^{+++}$, $As^{+++++}$, $Sb^{+++}$, $Sb^{+++++}$, $Sn^{++}$, $Sn^{++++}$, $Fe^{+++}$, $Al^{+++}$, $Cr^{+++}$, $Mn^{++}$, $Zn^{++}$, $Co^{++}$, $Ni^{++}$, $Cd^{++}$, $Sr^{++}$, $Mg^{++}$, $Na^+$, $K^+$, $NH_4^+$ and such anions as $OH^-$, $SO_4^{--}$, $SiF_6^{--}$, $C_2O_4^{--}$, $F^-$, $Cr_2O_7^{--}$, $SO_3^{--}$, $S_2O_3^{--}$, $CrO_4^{--}$, $PO_4^{---}$, $AsO_4^{---}$, $AsO_3^{---}$, $SiO_3^{--}$, $BO_2^-$, $CO_3^{--}$, $C_4H_4O_6^{--}$, $Cl^-$, $Br^-$, $CN^-$, $Fe(CN)_6^{----}$, $Fe(CN)^{---}$, $ClO^-$, $SCN^-$, $S^{--}$, $NO_3^-$, $NO_2^-$, $ClO_3^-$, $CH_3COO^-$. Illustrative inorganic salts include sodium chloride, barium chloride, calcium chloride, aluminum sulfate, sodium sulfate, sodium phosphate, potassium chloride, potassium sulfate, sodium borate, sodium silicate, and the like.

The following non-limiting examples are illustrative of the present invention.

EXAMPLE I

This example illustrates the effectiveness of the two stage treatment of this invention for flocculating and settling finely-divided material from an aqueous suspension as hereinbefore described. The suspension which was utilized in this experiment was a sample of the complex oil-clay-sand slimes, containing about 2.0% by weight of suspended solids, obtained from the tailings storage pond from the hot water process employed by the Great Canadian Oil Sands Limited. The primary flocculant was a graft copolymer produced by copolymerizing about 100 parts acrylic acid and about 1 part of carboxymethyl cellulose in accordance with the previously described procedure.

An aqueous solution containing 0.5% of the graft copolymer was added to a 100 milliliter sample of the slime in a graduated cylinder at the rate of about 1.5 pounds of polymer per ton of slime solids. The graduated cylinder was inverted several times to allow mixing. It was noted that there was rapid flocculation of a portion of the suspended solid content of the slime. A 0.05% aqueous solution of a nonionic polymer sold under the trademark of Polyox was then added to the liquid in the cylinder which was again inverted to allow mixing. A sufficient quantity of the aqueous solution was added to add the polymer at the rate of 2 pounds of polymer per ton of original slime solids. It was noted that this combination of polymers resulted in the rapid coagulation and settling of all of the suspended material to leave a clear supernatant liquid.

EXAMPLE II

An attempt was made to repeat the experiment of Example I except that an anionic acrylamide polymer sold under the trademark of AP-30 was added to the liquid in the cylinder in one pound increments up to ten pounds per ton of suspended solids. The addition of this anionic polymer did not result in the flocculation of any of the solid content of the suspension.

EXAMPLE III

Another attempt was made to carry out the experiment outlined in Example I using a guar derivative anionic polymer sold under the trademark of F-3 in one pound increments from one up to ten pounds per ton of suspended solids. It was again observed that the use of an anionic polymer other than an acrylic acid-derived polymer as hereinbefore defined was without effect.

EXAMPLE IV

A series of experiments are conducted to demonstrate the usefulness of various materials as secondary flocculants. In these experiments the primary flocculant is a graft copolymer produced as hereinbefore described by utilizing methyl cellulose as the substrate. When alum, an acrylamide polymer sold under the trademark of Separan NP-10, and thorium nitrate are each added to separate quantities of the suspension to which the graft copolymer is previously added, there is flocculation and settling of the solid contents of the suspensions.

Although this invention has been described in relation to specific embodiments, it will be apparent that obvious modifications may be made by one skilled in the art without departing from the intended scope of the invention as defined by the appended claims.

We claim:

1. A process for flocculating and settling finely-divided clay having hydrocarbons in intimate association therewith and silica from an aqueous suspension thereof having a pH from about 6.0 to about 10.0, which comprises first adding to said suspension from about 1 to about 2.5 pounds per ton of suspended solids of a water-soluble primary flocculant having a molecular weight of at least about 10,000 which is a graft copolymer of acrylic acid and from about 0.1 to about 10% by weight, based on the weight of said acrylic acid, of carboxymethyl cellulose, or a water-soluble salt of said graft copolymer, and then adding from about 1 to about 3 pounds per ton of suspended solids of a water-soluble secondary flocculant which is a polyethylene oxide having a molecular weight of at least about four million.

2. A process in accordance with claim 1 wherein said primary flocculant is a graft copolymer of about 100 parts by weight of acrylic acid and about 1 part by weight of carboxymethyl cellulose.

References Cited

UNITED STATES PATENTS

| | | | |
|---|---|---|---|
| 3,020,230 | 2/1962 | Smith | 210—54 |
| 3,095,391 | 6/1963 | Brockway et al. | 260—17.4 |
| 3,408,293 | 10/1968 | Dajani et al. | 210—53 |
| 3,480,761 | 11/1969 | Kolodny et al. | 210—54 |
| 3,487,003 | 12/1969 | Baillie et al. | 208—11 |

REUBEN FRIEDMAN, Primary Examiner

T. G. WYSE, Assistant Examiner

U.S. Cl. X.R.

208—11; 210—54

UNITED STATES PATENT OFFICE
CERTIFICATE OF CORRECTION

Patent No. 3,723,310  Dated March 27, 1973

Inventor(s) William J. Lang and Donald A. Hentz

It is certified that error appears in the above-identified patent and that said Letters Patent are hereby corrected as shown below:

Column 2, line 37, after "the" and before "time", -- same -- should be inserted; column 2, line 71, "star" should read -- tar --. Column 3, line 6, "200" should be -- 2000 --. Column 4, line 59, "0.05" should be -- 0.005 --. Column 6, line 42, "peroxygentype" should read -- peroxygen-type --. Column 8, line 20, "$Fe(CN)^{---}$" should read -- $Fe(CN)_6$ --.

Signed and sealed this 27th day of November 1973.

(SEAL)
Attest

EDWARD M. FLETCHER, JR.
Attesting Officer

RENE D. TEGTMEYER
Acting Commissioner of Patents